(12) United States Patent
Van Nuffel et al.

(10) Patent No.: US 8,357,441 B2
(45) Date of Patent: Jan. 22, 2013

(54) IGNITION RESISTANT CARBONATE POLYMER COMPOSITION

(75) Inventors: Claude T. Van Nuffel, Oostakker (BE); Pascal Lakeman, Bergen op Zoom (NL); Jozef Van Dun, Zandhoven (BE); Giacomo Parisi, Vogelwaarde (NL); Mike J. Hale, Hoek (NL)

(73) Assignee: Styron Europe GmbH, Horgen (CH)

( * ) Notice: Subject to any disclaimer, the term of this patent is extended or adjusted under 35 U.S.C. 154(b) by 73 days.

(21) Appl. No.: 13/057,713

(22) PCT Filed: Jul. 29, 2009

(86) PCT No.: PCT/US2009/052025
§ 371 (c)(1),
(2), (4) Date: Feb. 4, 2011

(87) PCT Pub. No.: WO2010/017067
PCT Pub. Date: Feb. 11, 2010

(65) Prior Publication Data
US 2011/0129631 A1     Jun. 2, 2011

Related U.S. Application Data

(60) Provisional application No. 61/086,578, filed on Aug. 6, 2008.

(51) Int. Cl.
*B29D 22/00* (2006.01)
*C07F 9/09* (2006.01)

(52) U.S. Cl. .................. 428/36.92; 524/127
(58) Field of Classification Search .......... 428/36.92; 524/127
See application file for complete search history.

(56) References Cited

U.S. PATENT DOCUMENTS

| 5,643,981 | A | | 7/1997 | Yang et al. | |
|---|---|---|---|---|---|
| 6,001,929 | A | * | 12/1999 | Nodera et al. | 525/92 E |
| 6,590,015 | B1 | * | 7/2003 | Wittmann et al. | 524/127 |
| 2007/0082995 | A1 | * | 4/2007 | Costanzi et al. | 524/414 |

OTHER PUBLICATIONS

International Search Report for PCT/US2009/052025 dated Oct. 13, 2009.
Briers, J. "New Development in PTFE-Based Anti-Dripping Additives," *12th International Plastics Additives and Modifiers Conference*, 2006, Cologne, Germany, 2 pages.

\* cited by examiner

*Primary Examiner* — William Cheung
(74) *Attorney, Agent, or Firm* — Brinks Hofer Gilson & Lione

(57) ABSTRACT

The present invention is an ignition resistant carbonate polymer composition, a method to make said composition and fabricated articles made therefrom. The ignition resistant carbonate polymer composition comprises: (i) an aromatic polycarbonate or an aromatic polyester carbonate, (ii) a graft polymer, (iii) optionally one or more thermoplastic vinyl (co)polymer, (iv) optionally one or more thermoplastic polyester polymer, (v) an aromatic phosphate compound, and (vi) a mixture of a fibril forming polytetrafluoroethylene polymer and a fluorothermoplast.

12 Claims, No Drawings

IGNITION RESISTANT CARBONATE POLYMER COMPOSITION

CROSS REFERENCE STATEMENT

This application is the National Stage of International Application No. PCT/US2009/052025 filed Jul. 29, 2009, which claims the benefit of U.S. Provisional Application No. 61/086,578 filed Aug. 6, 2008.

FIELD OF THE INVENTION

The present invention relates to an ignition resistant carbonate polymer composition comprising a polycarbonate (PC) and/or a polyester carbonate (PEC) and/or blends of PC or PEC; a graft polymer, preferably an acrylonitrile, butadiene, and styrene terpolymer (ABS); an aromatic phosphorous compound; and an anti drip agent comprising a mixture of a fibril forming polytetrafluoroethylene polymer and a fluorothermoplast. The present invention further relates to a method to make said ignition resistant carbonate polymer composition and fabricated articles formed therefrom.

BACKGROUND OF THE INVENTION

Ignition resistant carbonate polymer compositions are known, for example see U.S. Pat. Nos. 5,061,745; 6,596,794; 6,727,301; 6,753,366; and Re 36,188. These patents describe compositions comprising a carbonate polymer, a graft polymer, a phosphorus compound, and Teflon. For many years, ignition resistant carbonate polymer compositions have enjoyed widespread success in applications such as electronic equipment, appliance, and tool enclosures and components. In addition to providing an attractive housing for such articles, these enclosures may also play important structural roles. Additionally, one of the key requirements these enclosures must fulfill is, in the event that the electronics in an electronic article fail and catch on fire, the ignition resistant carbonate polymer enclosure must contain the fire so that it does not spread outside of the electronic article. If an electronic article enclosure catches fire and begins to drip and the drip is a flaming drip, the fire can easily spread and endanger both life and property.

These types of ignition resistant carbonate polymer compositions typically need to meet flammability requirements from one or more regulatory agency, for example Underwriter's Laboratories. The procedure in Underwriter's Laboratories Standard 94 (UL 94) characterizes a materials ease of ignition, and once ignited, its burning characteristics, i.e., is the material self extinguishing, how long does it burn, does it drip and if it drips, are they flaming drips.

Phosphorus compounds successfully minimize the ease of flammability in ignition resistant carbonate compositions by gas phase (as a free radical scavenger) and/or solid phase (promoting crosslinking) mechanisms. However, carbonate compositions, being thermoplastic, are predisposed to dripping when heated. Teflon, preferably a fibril forming type, has been very successfully used as an anti drip agent. Generally, with few exceptions, Teflon is found in all of the prior art describing ignition resistant carbonate polymer compositions.

However, as effective as Teflon is as an anti drip agent, it has several drawbacks related to both ease of handling during manufacturing of the ignition resistant carbonate composition (e.g., fouling airvey systems and during extrusion, bridging in the feed hopper throat) as well as several detrimental effects to the physical and aesthetic properties of the ignition resistant carbonate composition, especially in a fabricated article (e.g., reduced impact properties and pitting on the surface of fabricated articles). To compensate for reduced impact properties, often times it is necessary to include an impact modifier to the ignition resistant carbonate polymer composition which increases the complexity and cost to manufacture such compositions.

US Publication No. 2005/0250908 discloses an attempt to solve premature fibrillation and agglomeration of Teflon used as a processing aid in olefin polymers. However, such olefin polymer compositions can not meet the demanding physical, mechanical, thermal, flammability, and aesthetic requirements for applications such as electronic equipment, appliance, and tool enclosures and components.

An attempt to minimize the detrimental effect of the Teflon in ignition resistant carbonate compositions is disclosed in U.S. Pat. No. 6,828,366 wherein the amount of Teflon is reduced, however an additional inorganic material, e.g., talc, is required and mechanical and flammability properties are inferior. An attempt to eliminate Teflon and replace it with flake-form fillers such as mica and/or glass flakes, optionally also in combination with glass fibers is disclosed in U.S. Pat. No. 5,961,915. However, there is no information as to the quality of the flame resistance of the carbonate polymer compositions, in particular regarding the tendency to drip burning material. Also the high inorganic filler content of the carbonate polymer compositions described affects negatively some mechanical properties, for instance impact strength which for many applications is inadequate. WO 99/57198 describes ignition resistant carbonate polymer compositions comprising a phosphorus compound and a low amount of Teflon. However, such compositions have poor resistance to ESC and inadequate heat resistance, as well as a melt stability which is frequently inadequate, in particular for extrusion applications.

It would be desirable to have an ignition resistant carbonate polymer composition comprising an anti drip agent which is easy to handle during manufacturing but does not diminish the physical, mechanical, thermal, flammability, and aesthetic properties of the ignition resistant carbonate polymer, especially for said composition in the form of a fabricated article.

SUMMARY OF THE INVENTION

The present invention is such an ignition resistant carbonate polymer composition. The ignition resistant carbonate polymer composition of the present invention comprises: (i) an aromatic polycarbonate or an aromatic polyester carbonate, (ii) a graft polymer, (iii) optionally one or more thermoplastic vinyl (co)polymer, (iv) optionally one or more thermoplastic polyester polymer, (v) an aromatic phosphorous compound represented by the formula I:

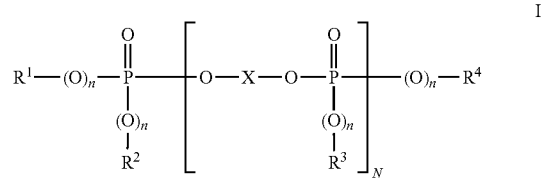

wherein, $R^1$, $R^2$, $R^3$ and $R^4$ independently of one another each denote optionally halogenated $C_1$- to $C_8$-alkyl, or $C_5$- to $C_6$-cycloalkyl, $C_6$- to $C_{20}$-aryl or $C_7$- to $C_{12}$-aralkyl, in each case optionally substituted by alkyl and/or halogen, X denotes a mono- or polynuclear aromatic radical having 6 to 30 C atoms, n independently of one another is 0 or 1, N represents values from 0 to 30, (vi) a mixture of a fibril forming polytetrafluoroethylene polymer and fluorothermoplast, and (vii) optionally an hypophosphorous acid metal salt.

In another embodiment, component (i) in the hereinabove composition is present in an amount from 40 to 99 parts by weight and preferably from 60 to 98.5 parts by weight based on the total weight of the ignition resistant carbonate polymer composition.

In another embodiment, component (ii) in the hereinabove composition is present in an amount from 0.5 to 60 parts by weight, preferably 1 to 40 parts by weight based on the total weight of the ignition resistant carbonate polymer composition.

In another embodiment, component (ii) in the hereinabove composition is a graft polymer of (ii.a) from 5 to 99 percent by weight of one or more vinyl monomers on (ii.b) from 95 to 1 percent by weight of one or more grafting backbones with a glass transition temperature ($T_g$) of less than 10° C.

In another embodiment, component (ii) in the hereinabove composition is one or more graft polymer prepared by means of a mass, a bulk, a solution, a bulk-solution, or an emulsion polymerization process, separately of in combinations thereof.

In another embodiment, component (ii.b) in the hereinabove composition is a diene rubber, an acrylate rubber, a silicone rubber, or an ethylene-propylene diene rubber.

In another embodiment, component (iii) in the hereinabove composition is present in an amount from 0 to 45 parts by weight, preferably 0 to 30 parts by weight based on the total weight of the ignition resistant carbonate polymer composition.

In another embodiment, component (iv) in the hereinabove composition is present in an amount from 0 to 45 parts by weight, preferably 1 to 40 parts by weight, more preferably 1 to 30 parts by weight based on the total weight of the ignition resistant carbonate polymer composition. Preferably component (iv) is one or more of PET, PBT, or mixtures thereof wherein in each component (iv) independently preferably has an intrinsic viscosity of from 0.4 to 1.5 dl/g.

In another embodiment, in the hereinabove composition the ratio by weight of components (ii):(iii) and/or (ii):(iv) is between 2:1 and 1:4.

In another embodiment, component (v) in the hereinabove composition is present in an amount from 0.5 to 40 parts by weight, preferably from 1 to 20 parts by weight, preferably from 6 to 18 parts by weight based on the total weight of the ignition resistant carbonate polymer composition.

In another embodiment, in component (v) in the hereinabove composition N has the value of from 0.3 to 20.

In another embodiment, component (v) in the hereinabove composition is at least one member selected from the group consisting of tributyl phosphate, tris-(2-chloroethyl) phosphate, tris-(2,3-dibromopropyl)phosphate, triphenyl phosphate, tricresyl phosphate, diphenyl cresyl phosphate, diphenyl octyl phosphate, diphenyl 2-ethylcresyl phosphate, tri-(isopropylphenyl)phosphate, halogen-substituted aryl phosphates, methylphosphonic acid dimethyl ester, methylphosphonic acid diphenyl ester, phenylphosphonic acid diethyl ester, triphenylphosphine oxide and tricresylphosphine oxide.

In another embodiment, in component (v) in the hereinabove composition X is derived from a diol selected from diphenylphenol, bisphenol A, resorcinol or hydroquinone.

In another embodiment, component (v) in the hereinabove composition the phosphorus compound has the formula Ia:

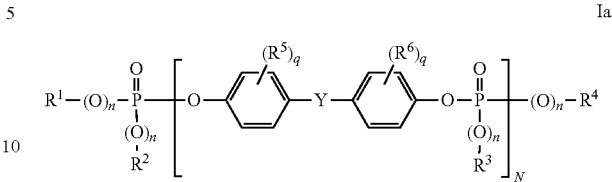

Ia wherein $R^5$ and $R^6$ independently of one another denote $C_1$-$C_4$ or halogen, q represents 0, 1 or 2 and Y denotes $C_1$-$C_7$-alkylidene, $C_1$-$C_7$-alkylene, $C_5$-$C_{12}$-cycloalkylene, $C_5$-$C_{12}$-cycloalkylidene, —O—, —S—, —SO—, —SO$_2$—, or —CO—.

In another embodiment, component (v) in the hereinabove composition the phosphorous compound comprises a mixture of from 3 to 95 weight percent monophosphate compound of formula I and 97 to 5 weight percent oligomeric phosphate compound of formula I.

In another embodiment, component (vi) in the hereinabove composition the mixture of the fibril forming polytetrafluoroethylene polymer and a fluorothermoplast is present in an amount of from 0.01 to 5 parts by weight, preferably from 0.1 to 3 parts by weight based on the total weight of the ignition resistant carbonate polymer composition.

In another embodiment, component (vi) in the hereinabove composition the fluorothermoplast comprises from 10 to 60 percent by weight based on the total weight of fibrillating polytetrafluoroethylene preferably from 15 to 30 percent by weight based on the total weight of fibrillating polytetrafluoroethylene polymer.

In another embodiment, component (vi) in the hereinabove composition the fluorothermoplast comprises a polymer of interpolymerized units derived from tetrafluoroethylene (TFE) and hexafluoropropylene (HFP), a polymer of interpolymerized units derived from TFE, HFP and vinylidenefluoride (VDF), a polymer of interpolymerized units derived from TFE, HFP and a monomer represented by formula $R^8_2C=CR^8_2$, or a polymer derived from interpolymerized units derived from TFE and a monomer represented by formula $R^8_2C=CR^8_2$ wherein each of $R^8$ is independently selected from H, Cl, or an alkyl group of from 1 to 8 carbon atoms, a cyclic alkyl group of from 1 to 10 carbon atoms, or an aryl group of from 1 to 8 carbon atoms.

In another embodiment, the fluorothermoplast in component (vi) in the hereinabove composition comprises from 15 to 30 parts by weight based on the total weight of fibrillating polytetrafluoroethylene polymer.

In another embodiment, the hereinabove composition further comprises an hypophosphorous acid metal salt preferably aluminium hypophosphite, calcium hypophosphite and/or mixtures thereof preferably in an amount defined by the ratio of the phosphorus compound (v): the hypophosphorous acid metal salt (vii) of from 1:2 to 1:5

In another embodiment, the hereinabove composition further comprises one or more impact modifier selected from an acrylic rubber, SB copolymer, ES copolymer, EP copolymer, EPDM, MBS, or mixtures thereof.

In another embodiment, the hereinabove composition further comprises at least one of a lubricant, a mold release agent, a nucleating agent, an anti-static agent, a stabilizer, a filler, a reinforcing material, a dye, and a pigment.

In another embodiment, the hereinabove composition further comprises from about 1 to 40 parts by weight of one or more of glass fibers, glass beads, mica, silicates, quartz, talc, titanium dioxide, or wollastonite alone or in combinations thereof.

In another embodiment, the present invention is a method to make the hereinabove composition comprising the steps of melt-compounding components (i), (ii), (v), (vi) and optionally (iii) and/or (iv).

In another embodiment, the present invention is a formed article comprising the hereinabove composition preferably by one or more of the following fabricating processes: compression molding, injection molding, gas assisted injection molding, calendaring, vacuum forming, thermoforming, extrusion, or blow molding, alone or in combination and the formed article is an interior trim for rail vehicles, an interior and/or exterior automotive article, an enclosure for electrical devices containing small transformers, an enclosure for information dissemination and/or transmission device, an enclosure and/or cladding for medical purposes, a message device and/or enclosures therefore, a toy vehicles for children, a sheet wall element, an enclosure for safety equipment, a hatchback spoiler, a thermally insulated transport container, an apparatus for keeping and/or caring for small animals, an article for sanitary and/or bathroom installations, a cover grill for ventilation openings, an article for summer houses and sheds, and/or enclosures for garden appliances. Preferred fabricated articles include an instrument housing or enclosure such as for: a power tool, an appliance, a consumer electronic equipment such as a TV, a VCR, a DVD player, a web appliance, an electronic book, etc., or an enclosure for: information technology equipment such as a telephone, a computer, a monitor, a fax machine, a battery charger, a scanner, a copier, a printer, a hand held computer, a flat screen display, and the like.

DETAILED DESCRIPTION OF THE INVENTION

Component (i) of the present invention is a thermoplastic aromatic polycarbonate and/or aromatic polyester carbonate. Suitable aromatic polycarbonates and/or aromatic polyester carbonates according to the invention are known from the literature or can be produced by methods known from the literature (for example, for the production of aromatic polycarbonates, see Schnell, "Chemistry and Physics of Polycarbonates", Interscience Publishers, 1964, as well as U.S. Pat. Nos. 3,028,365; 4,529,791; and 4,677,162; which are hereby incorporated by reference in their entirety. Suitable aromatic polyester carbonates are described in U.S. Pat. Nos. 3,169,121; 4,156,069; and 4,260,731; which are hereby incorporated by reference in their entirety.

The production of aromatic polycarbonates is effected, for example, by the reaction of diphenols with carbonic acid halides, preferably phosgene, and/or with aromatic dicarboxylic acid dihalides, preferably benzenedicarboxylic acid dihalides, by the phase boundary method, optionally with the use of chain terminators, e.g., monophenols, and optionally with the use of trifunctional branching agents or branching agents with a functionality higher than three, for example triphenols or tetraphenols.

Diphenols for the production of the aromatic polycarbonates and/or aromatic polyester carbonates are preferably those of formula II

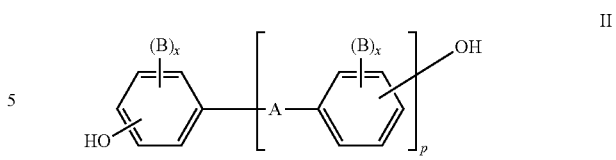

wherein A denotes a single bond, a $C_1$-$C_5$ alkylene, a $C_2$-$C_5$ alkylidene, a $C_5$-$C_6$ cycloalkylidene, —O—, —SO—, —CO—, —S—, —SO$_2$—, or a $C_6$-$C_{12}$ arylene, on to which other aromatic rings, which optionally contain hetero atoms, can be condensed, or a radical of formula III or IV

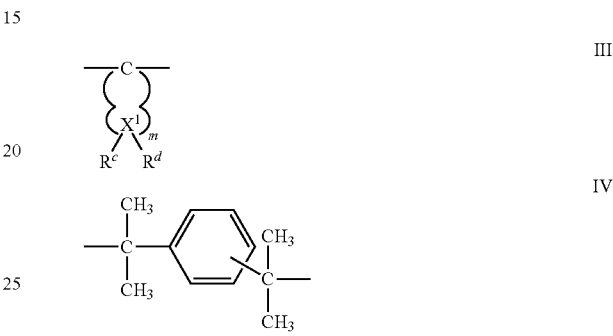

B in each case is independently hydrogen, a $C_1$-$C_{12}$ alkyl, preferably methyl, or a halogen, preferably chlorine and/or bromine;

x in each case is mutually independently 0, 1, or 2;

p is 0 or 1;

$R^c$ and $R^d$ are mutually independent of each other and are individually selectable for each $X^1$ and are hydrogen or a $C_1$-$C_6$ alkyl, preferably hydrogen, methyl or ethyl;

$X^1$ denotes carbon; and m denotes an integer from 4 to 7, preferably 4 or 5, with the proviso that $R^c$ and $R^d$ simultaneously denote an alkyl on at least one $X_1$ atom.

The preferred diphenols are hydroquinone, resorcinol, dihydroxybiphenyls, bis(hydroxyphenyl)-$C_1$-$C_5$ alkanes, bis(hydroxyphenyl)-$C_5$-$C_6$ cycloalkanes, bis(hydroxyphenyl) ethers, bis(hydroxyphenyl)sulfoxides, bis(hydroxyphenyl) ketones, bis(hydroxyphenyl)sulfones and alpha, alpha'-bis (hydroxyphenyl)diisopropylbenzenes, as well as derivatives thereof which have brominated and/or chlorinated nuclei.

Diphenols which are particularly preferred are 4,4'-dihydroxybiphenyl, bisphenol A, 2,4-bis(4-hydroxyphenyl)-2-methylbutane, 1,1-bis(4-hydroxyphenyl)-cyclohexane, 1,1-bis (4-hydroxyphenyl)-3,3,5-trimethylcyclohexane, 4,4-dihydroxydiphenyl sulfide and 4,4-dihydroxydiphenyl sulfone, as well as di- and tetrabrominated or chlorinated derivatives thereof, such as 2,2-bis(3-chloro-4-hydroxyphenyl) propane, 2,2-bis-(3,5-dichloro-4-hydroxyphenyl) propane or 2,2-bis(3,5-dibromo-4-hydroxyphenyl)propane. 2,2-bis-(4-hydroxyphenyl)propane (bisphenol A) is particularly preferred. The diphenols can be used individually or as arbitrary mixtures. The diphenols are known from the literature or can be obtained by methods known from the literature.

Examples of suitable chain terminators for the production of the aromatic polycarbonates include phenol, p-chlorophenol, p-tert-butylphenol or 2,4,6-tribromophenol, as well as long chain alkylphenols such as 4-(1,3-dimethyl-butyl)-phenol or monoalkylphenols or dialkylphenols which contain a total of 8 to 20 C atoms in their alkyl substituents, such as 3,5-di-tert-butyl-phenol, p-iso-octylphenol, p-tert-octylphenol, p-dodecylphenol, 2-(3,5-dimethylheptyl)-phenol and 4-(3,5-dimethylheptyl)-phenol. The amount of chain terminators used is generally between 0.1 mole percent and 10 mole percent with respect to the molar sum of the diphenols used in each case.

The aromatic polycarbonates and/or aromatic polyester carbonates of the present invention preferably have a mean weight average molecular weights of from about 10,000 to about 200,000 preferably about 20,000 to about 80,000. Unless otherwise indicated, the references to aromatic polycarbonate and/or aromatic polyester carbonate "molecular weight" herein refer to weight average molecular weights ($M_w$) determined by gel permeation chromatography (GPC) using laser scattering techniques with a bisphenol A polycarbonate standard and is given in units of grams per mole (g/mole).

The aromatic polycarbonates can be branched in the known manner, for example by the incorporation of 0.05 to 2.0 mole percent, with respect to the sum of the diphenols used, of trifunctional compounds or of compounds with a functionality higher than three, for example those which contain three or more phenolic groups. Branched polycarbonates suitable for the present invention can be prepared by known techniques, for example several suitable methods are disclosed in U.S. Pat. Nos. 3,028,365; 4,529,791; and 4,677,162; which are hereby incorporated by reference in their entirety.

Suitable branching agents that may be used are tri- or multi-functional carboxylic acid chlorides, such as trimesic acid trichloride, cyanuric acid trichloride, 3,3'-,4,4'-benzophenonetetracarboxylic acid tetrachloride, 1,4,5,8-naphthalene-tetracarboxylic acid tetrachloride or pyromellitic acid tetrachloride for example, in amounts of 0.01 to 1.0 mole percent (with respect to the dicarboxylic acid dichlorides used) or tri- or multi-functional phenols such as phloroglucinol, 4,6-dimethyl-2,4,6-tris(4-hydroxyphenyl)-2-heptene, 4,4-dimethyl-2,4,6-tris(4-hydroxyphenyl)heptane, 1,3,5-tris (4-hydroxyphenyl)benzene, 1,1,1-tris (4-hydroxyphenyl) ethane, tris(4-hydroxyphenyl)-phenyl-methane, 2,2-bis[4,4-bis(4-hydroxyphenyl) cyclohexyl]-propane, 2,4-bis[1-(4-hydroxyphenyl)-1-methylethyl]phenol, tetrakis(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)propane, or tetrakis(4-[1-(4-hydroxyphenyl)-1-methylethyl]-phenoxy)-methane in amounts of 0.01 to 1.0 mole percent with respect to the diphenols used. Phenolic branching agents can be placed in the reaction vessel with the diphenols. Acid chloride branching agents can be introduced together with the acid chlorides.

Both homopolycarbonates and copolycarbonates are suitable. For the production of copolycarbonates according to component (i) in accordance with the invention, 1 to 25 parts by weight, preferably 2.5 to 25 parts by weight (with respect to the total amount of diphenols to be used) of polydiorganosiloxanes comprising hydroxy-aryloxy terminal groups can also be used. These are known (see, for example, U.S. Pat. No. 3,419,634) or can be produced by methods known from the literature.

Apart from bisphenol A homopolycarbonates, the preferred polycarbonates are the copolycarbonates of bisphenol A with up to 15 mole percent, with respect to the molar sums of the diphenols, of other diphenols which are cited as preferred or particularly preferred, in particular 2,2-bis(3,5-dibromo-4-hydroxyphenyl)-propane.

The preferred aromatic dicarboxylic acid dihalides for the production of the aromatic polyester carbonates are the diacid dichlorides of isophthalic acid, terephthalic acid, diphenyl ether-4,4'-dicarboxylic acid and naphthalene-2,6-dicarboxylic acid. Mixtures of the diacid dichlorides of isophthalic acid and terephthalic in a ratio between 1:20 and 20:1 are particularly preferred. A carbonic acid halide, preferably phosgene, is used in conjunction as a difunctional acid derivative during the production of the polyester carbonates.

Apart from the aforementioned monophenols, suitable chain terminators for the production of the aromatic polyester carbonates include chlorocarboxylic acid esters thereof, as well as the acid chlorides of aromatic monocarboxylic acids which may optionally be substituted by $C_1$-$C_{22}$ alkyl groups, or by halogen atoms, and also include aliphatic $C_2$-$C_{22}$ monocarboxylic acid chlorides. The amount of chain terminator is 0.1 to 10 mole percent in each case, with respect to the moles of diphenols in the case of phenolic chain terminators and with respect to the moles of dicarboxylic acid dichlorides in the case of monocarboxylic acid chloride chain terminators.

The aromatic polyester carbonates may also contain incorporated hydroxycarboxylic acids. The aromatic polyester carbonates may be either linear or may be branched. Suitable branching agents are disclosed hereinabove.

The proportion of carbonate structural units in the aromatic polyester carbonates can be arbitrarily varied. The content of carbonate groups is preferably up to 100 mole percent, particularly up to 80 mole percent, most preferably up to 50 mole percent, with respect to the sum of ester groups and carbonate groups. Both the ester and the carbonate fraction of the aromatic polyester carbonates can be present in the form of blocks, or can be randomly distributed in the condensation polymer.

The relative solution viscosity ($\eta_{rel}$) of the aromatic polycarbonates and aromatic polyester carbonates is within the range of 1.18 to 1.4, preferably 1.22 to 1.3 (as measured on solutions of 0.5 g of polycarbonate and polyester carbonate, respectively, in 100 mL of methylene chloride at 25° C.).

The aromatic polycarbonates and aromatic polyester carbonates can be used individually or in any mixture with each other.

The thermoplastic aromatic polycarbonates and/or aromatic polyester carbonates (i) are present in an amount equal to or greater than about 40 parts by weight, preferably equal to or greater than about 50 parts by weight and more preferably equal to or greater than about 60 parts by weight based on the total weight of the ignition resistant carbonate polymer composition. The thermoplastic aromatic polycarbonates and/or aromatic polyester carbonates (i) are present in an amount equal to or less than about 99 parts by weight, preferably equal to or greater than about 98.5 parts by weight, more preferably equal to or greater than about 95 parts by weight, more preferably equal to or greater than about 90 parts by weight, more preferably equal to or less than about 85 parts by weight, and more preferably equal to or less than about 80 parts by weight based on the weight of the ignition resistant carbonate polymer composition. Unless stated otherwise, parts by weight are based on the total weight of the ignition resistant carbonate polymer composition.

Component (ii) of the present invention is one or more graft copolymers of (ii.a) 5 to 99, preferably 30 to 80 percent by weight, of one or more vinyl monomers on (ii.b) 95 to 1, preferably 70 to 20 percent by weight of one or more grafting backbones with a glass transition temperature less than 10° C., preferably less than 0° C., preferably less than about −10° C., and more preferably less than −20° C. The grafting backbone (ii.b) generally has an average particle size ($D_v$, value) of from 0.01 to 7 microns.

Monomers (ii.a) are preferably mixtures of (ii.a.1) 50 to 99 parts by weight of aromatic vinyl compounds and/or aromatic vinyl compounds with substituted nuclei (such as styrene, alpha-methylstyrene, p-methylstyrene or p-chlorostyrene) and/or butylacrylate, ethylacrylate, or ethylhexylacrylate and/or $C_1$-$C_4$ alkyl esters of (meth)acrylic acid (such as methyl methacrylate or ethyl methacrylate), and (ii.a.2) 1 to 50 parts by weight of vinyl cyanides (unsaturated nitriles, such as acrylonitrile and methacrylonitrile) and/or $C_1$-$C_4$ alkyl esters of (meth)acrylic acid (such as methyl methacrylate, n-butyl acrylate and t-butyl acrylate) and/or derivatives (such as anhydrides and imides) of unsaturated carboxylic acids (for example maleic anhydride and N-phenylmaleimide).

The preferred monomers (ii.a.1) are selected from at least one of the monomers styrene, alpha-methylstyrene and methyl methacrylate. The preferred monomers (ii.a.2) are selected from at least one of the monomers acrylonitrile, maleic anhydride and methyl methacrylate. The monomers which are particularly preferred are styrene as (ii.a.1) and acrylonitrile as (ii.a.2).

Examples of suitable grafting backbones (ii.b) for graft polymers (ii) include diene rubbers, ethylene/propylene and optionally diene (EP(D)M) rubbers, acrylate, polyurethane, silicone, silicone/acrylate, chloroprene and ethylene/vinyl acetate rubbers.

The preferred grafting backbones (ii.b) are diene rubbers (for example based on butadiene, isoprene, etc.) or mixtures of diene rubbers or copolymers of diene rubbers or mixtures thereof with other copolymerizable monomers (for example according to (ii.a.1) and (ii.a.2)), providing that the glass transition temperature is less than about 10° C., preferably less than about 0° C., preferably less than about –10° C., and more preferably less than about –20° C. Pure polybutadiene rubber is particularly preferred. A particularly preferred graft polymer (ii) is acrylonitrile, butadiene, and styrene terpolymer (ABS).

Graft copolymers (ii) are produced by radical polymerization, for example by emulsion, mass, suspension, solution or bulk polymerization. For examples of the mass, bulk, mass-solution (sometimes referred to as solution), or mass-suspension (sometimes referred to as suspension) polymerization, which are generally known as mass polymerization processes, see U.S. Pat. Nos. 3,660,535; 3,243,481; and 4,239,863; which are incorporated herein by reference. Suitable ABS polymers may be produced by redox initiation with an initiator system comprising an organic hydroperoxide and ascorbic acid according to U.S. Pat. No. 4,937,285; which is incorporated herein by reference. Depending on the desired end properties (for example impact strength, weld line strength, gloss, tensile properties, flexural properties, etc.) of the ignition resistant carbonate polymer composition of the present invention, emulsion polymerized graft polymer may be preferred or mass polymerized graft polymer may be preferred or a mixture of emulsion polymerized and mass polymerized graft polymer may be preferred.

Suitable acrylate rubbers according to (ii.b) of polymer (ii) are preferably polymers of acrylic acid alkyl esters, optionally with up to 40 percent by weight, with respect to (ii.b), of other polymerizable, ethylenically unsaturated monomers. The preferred polymerizable acrylic acid esters include $C_1$-$C_8$ alkyl esters, for example methyl, ethyl, butyl, n-octyl and 2-ethylhexyl esters: halogenoalkyl esters, preferably halogeno-$C_1$-$C_8$-alkyl esters such as chloroethyl acrylate, as well as mixtures of these monomers.

Monomers with more than one polymerizable double bond can be copolymerized to provide cross-linking. The preferred examples of cross-linking monomers are the esters of unsaturated monocarboxylic acids containing 3 to 8 C atoms and unsaturated monohydric alcohols containing 3 to 12 C atoms, or saturated polyols containing 2 to 4 OH groups and 2 to 20 C atoms, such as ethylene glycol dimethacrylate or allyl methacrylate for example; multiply-unsaturated heterocyclic compounds, such as trivinyl and triallyl cyanurate for example; polyfunctional vinyl compounds such as di- and trivinylbenzenes; and also triallyl phosphate and diallyl phthalate.

The preferred cross-linking monomers are allyl methacrylate, ethylene glycol dimethacrylate, diallyl phthalate and heterocyclic compounds which contain at least 3 ethylenically unsaturated groups. Cross-linking monomers which are particularly preferred are the cyclic monomers triallyl cyanurate, triallyl isocyanurate, triacryloyl hexahydro-s-triazine and triallylbenzenes. The amount of cross-linked monomer is preferably 0.02 to 5, particularly 0.05 to 2 percent by weight, with respect to graft base (ii.b). For cyclic cross-linking monomers containing at least 3 ethylenically unsaturated groups, it is advantageous to restrict the amount thereof to less than 1 percent by weight of graft base (ii.b).

Examples of preferred "other" polymerizable, ethylenically unsaturated monomers which can optionally be employed apart from acrylic acid esters for the production of graft base (ii.b) include acrylonitrile, styrene, alpha-methylstyrene, acrylamides, vinyl-$C_1$-$C_6$-alkyl ethers, methyl methacrylate and butadiene. The acrylate rubbers which are preferred as the grafting backbone (ii.b) are emulsion polymers which have a gel content of at least 20 percent, preferably 40 percent, more preferably 60 percent by weight.

Other grafting backbones which are suitable according to (ii.b) are silicone rubbers with graft-active sites.

Since, as is known, the graft monomers (ii.a) are not grafted completely on to the grafting backbone (ii.b) during the grafting reaction, graft polymers (ii) are also to be understood according to the invention to include those products which are obtained by (co)polymerization of the graft monomers in the presence of the graft base and which occur in conjunction during processing (i.e., (co)polymer from the polymerization of graft monomer (ii.a)).

Unless otherwise indicated, the average graft base particle size is a volume-weighted mean particle diameter ($D_v$) determined by analyzing Transmission Electron Microscopy (TEM) images, for a good discussion of particle size determination see U.S. Pat. No. 6,380,304 which is incorporated herein by reference. Typically, a correction for section thickness is done when particles are larger than 1 micron.

The average particle diameter of the grafting backbone (ii.b) produced by a mass process is equal to or greater than about 0.01 microns, preferably equal to or greater than about 0.1 microns, more preferably equal to or greater than about 0.2 microns, and even more preferably equal to or greater than about 0.3 microns. The average particle diameter of the grafting backbone (ii.b) produced by a mass process is equal to or less than about 7 microns, preferably equal to or less than about 6 microns, more preferably equal to or less than about 5 microns, and even more preferably equal to or less than about 4 microns.

The rubber-modified polymers of the present invention can have both a broad monomodal particle size distribution or a multi-modal particle size distribution, for example, bimodal particle size distribution. In either case, the rubber components can comprise one rubber or a blend of rubbers. In particular, more than one rubber can be used in a monomodal or bimodal process. A bimodal rubber particle size distribution is defined as having two distinct peaks of particles when graphed on axes of particle size vs volume fraction, whereby one peak designates smaller particles and the other peak designates larger particles.

Typically, in a mass produced grafting backbone bimodal particle size distribution, the larger particle fraction will have a volume average particle size of from about 0.5 microns, and most preferably from about 0.7 microns to about 3 microns, preferably to about 2.5 microns, and most preferably to about 2 microns. Typically, the smaller particle fraction will have a volume average particle size of from about 0.01 microns, preferably from about 0.1 microns to 0.4 microns, preferably to about 0.35 microns, and more preferably to about 0.3 microns.

The gel content of graft base (ii.b) produced by a mass process can be determined at 25° C. in toluene and is at least 10 weight percent, preferably at least 15 weight percent, even more preferably at lest 20 weight percent, and most preferably at least 25 weight percent based on the total weight of the graft base (ii.b).

The average particle diameter of the grafting backbone (ii.b) produced by an emulsion process is equal to or greater than about 0.01 microns, preferably equal to or greater than about 0.03 microns, and even more preferably equal to or greater than about 0.05 microns. The average particle diameter of the grafting backbone (ii.b) produced by an emulsion process is equal to or less than about 2 microns, preferably equal to or less than about 1.5 microns, and even more preferably equal to or less than about 1 micron.

Typically, in an emulsion produced grafting backbone bimodal particle size distribution, the larger particle fraction will have a volume average particle size of from about 0.3 microns, more preferably from about 0.4 microns, and most preferably from about 0.5 microns to about 3 microns, preferably to about 2 microns, more preferably to about 1.5 microns, and most preferably to about 1 micron. Typically, the smaller particle fraction will have a volume average particle size of from about 0.01 microns, preferably from about 0.03 microns to 0.3 microns, preferably from about 0.05 microns to about 0.2 microns.

The gel content of an emulsion produced graft base (ii.b) is at least 20 percent by weight, preferably at least 30 percent, more preferably at least 40 percent, even more preferably at least 50 percent, and most preferably at least 60 percent by weight as measured in toluene.

For a mixture of mass produced graft polymer (ii) and emulsion produced graft polymer (ii) the average particle diameter of the grafting backbone (ii.b) is equal to or greater than about 0.01 microns, preferably equal to or greater than about 0.1 microns, more preferably equal to or greater than about 0.15 microns, more preferably equal to or greater than about 0.2 microns, and even more preferably equal to or greater than about 0.25 microns. For a mixture of mass produced graft polymer (ii) and emulsion produced graft polymer (ii) the average particle diameter of the grafting backbone (ii.b) is equal to or less than about 7 microns, preferably equal to or less than about 5 microns, more preferably equal to or less than about 4 microns, more preferably equal to or less than about 3 micron, and most preferably equal to or less than 2 microns.

For a mixture of mass produced graft polymer (ii) and emulsion produced graft polymer (ii) the resulting bimodal rubber particle size distribution may be described by the independent preferred rubber particle size ranges given hereinabove for mass produced graft polymer and emulsion produced graft polymer.

If present, the graft polymer (ii) is present in an amount equal to or greater than about 0.5 parts by weight, preferably equal to or greater than about 1 part by weight, more preferably equal to or greater than about 2 parts by weight, more preferably equal to or greater than about 5 parts by weight, and more preferably equal to or greater than about 10 parts by weight based on the total weight of the ignition resistant carbonate polymer composition. If present, the graft polymer (ii) is present in an amount equal to or less than about 60 parts by weight, preferably equal to or less than about 50 parts by weight, more preferably equal to or less than about 40 parts by weight, more preferably equal to or less than about 30 parts by weight, and more preferably equal to or less than about 25 parts by weight based on the total weight of the ignition resistant carbonate polymer composition.

Component (iii) of the present invention comprises one or more thermoplastic vinyl (co)polymers. Polymers which are suitable as component (iii) are polymers of at least one monomer from the group comprising aromatic vinyl compounds, vinyl cyanides (unsaturated nitriles), (meth)acrylic acid ($C_1$-$C_8$)-alkyl esters, unsaturated carboxylic acids, as well as derivatives (such as anhydrides and imides) of unsaturated carboxylic acids.

(Co)polymers which are particularly suitable are those of (iii.a) in an amount of from 50 to 99, preferably 60 to 80 parts by weight of aromatic vinyl compounds and/or aromatic vinyl compounds which comprise substituted nuclei, such as styrene, alpha-methylstyrene, p-methylstyrene, p-chlorostyrene and/or methacrylic acid ($C_1$-$C_4$)-alkyl esters, such as methyl methacrylate or ethyl methacrylate, and (iii.b) in an amount of from 1 to 50, preferably 20 to 40 parts by weight vinyl cyanides (unsaturated nitrites) such as acrylonitrile and methacrylonitrile and/or (meth)acrylic acid ($C_1$-$C_8$) esters (such as methyl methacrylate, n-butyl acrylate or t-butyl acrylate) and/or unsaturated carboxylic acids (such as maleic acid) and/or derivatives (such as anhydrides and imides) of unsaturated carboxylic acids (for example maleic anhydride and N-phenyl-maleimide).

The copolymer of (iii.a) styrene and (iii.b) acrylonitrile (SAN) is particularly preferred.

(Co)polymers (iii) are thermoplastic and free from rubber. The (co)polymers according to (iii) are known, and can be produced by radical polymerization, particularly by emulsion, suspension, solution or bulk (mass) polymerization. The (co)polymers according to component (iii) preferably have molecular weights $M_w$ (weight average, as determined by GPC using laser scattering techniques and narrow molecular weight polystyrene standards) between 15,000 and 200,000.

(Co)polymers according to component (iii) are frequently produced as by-products during the graft polymerization of component (ii), particularly when large amounts of monomers (ii.a) are grafted on to small amounts of rubber (ii.b). The amount of (iii) which can also optionally be used according to the invention does not include these by-products of the graft polymerization of (ii).

If component (iii) is present in the ignition resistant carbonate polymer compositions according to the invention, the ratio by weight of components (ii):(iii) may desirably be between 2:1 and 1:4, preferably between 1:1 and 1:2.

If present, the thermoplastic vinyl (co)polymer (iii) is present in an amount equal to or greater than about 0.5 parts by weight, preferably equal to or greater than about 1 part by weight, more preferably equal to or greater than about 2 parts by weight, more preferably equal to or greater than about 5 parts by weight, and more preferably equal to or greater than about 10 parts by weight based on the weight of the ignition resistant carbonate polymer composition. If present, the thermoplastic vinyl (co)polymer (iii) is present in an amount equal to or less than about 45 parts by weight, preferably equal to or less than about 40 parts by weight, more preferably equal to or less than about 35 parts by weight, more preferably equal to or less than about 30 parts by weight, and more preferably equal to or less than about 25 parts by weight based on the weight of the ignition resistant carbonate polymer composition.

Component (iv) of the present invention comprises a thermoplastic polyester polymer, preferably one or more thermoplastic polyalkylene dicarboxylate polymer which are reaction products of aromatic dicarboxylic acids or the reactive derivatives thereof, such as dimethyl esters or anhydrides, and aliphatic, cycloaliphatic or araliphatic diols, dialkyl esters, diacid chlorides, carboxylic acid salts, and diaryl esters, together with mixtures of these reaction products. The dicarboxylic acid may be an aliphatic acid such as succinic, glutaric, adipic, sebacic, azelaic, suberic acid, or cyclohexane dicarboxylic acid, or an aromatic acid such as isophtalic acid, terephthalic acid, naphthyl dicarboxylic acid, or biphenyl dicarboxylic acid. The aromatic acids, especially terephthalic acid, are preferred. The use of an ester and especially a lower alkyl ester is preferred, more preferably a methyl, ethyl or butyl ester.

Preferred polyalkylene dicarboxylate polymers are produced using a mole ratio of diol component to dicarboxylic acid or ester component from about 1:1 to about 1.4:1 and preferably from about 1.2:1 to about 1.3:1.

In addition to terephthalic acid residues, the preferred polyalkylene dicarboxylate may contain up to 20 mole percent, preferably up to 10 mole percent, of residues of other aromatic or cycloaliphatic dicarboxylic acids having 8 to 14 C atoms or aliphatic dicarboxylic acids having 4 to 12 C atoms, such as for example residues of phthalic acid, isophthalic acid, 2,6-naphthalenedicarboxylic acid, 4,4'-diphenyldicarboxylic acid, succinic acid, adipic acid, sebacic acid, azelaic acid, cyclohexanediacetic acid.

In addition to ethylene glycol or 1,4-butanediol residues, the preferred polyalkylene dicarboxylate polymers may contain up to 20 mole percent, preferably up to 10 mole percent, of other aliphatic diols having 3 to 12 C atoms or cycloaliphatic diols having 6 to 21 C atoms, for example residues of 1,3-propanediol, 2-ethyl-1,3-propanediol, neopentyl glycol, 1,5-pentanediol, 1,6-hexanediol, 1,4-cyclohexanedimethanol, 3-ethyl-2,4-pentane-diol, 2-methyl-2,4-pentanediol, 2,2,4-trimethyl-1,3-pentanediol, 2-ethyl-1,3-hexane-diol, 2,2-diethyl-1,3-propanediol, 2,5-hexanediol, 1,4-di-(.beta.-hydroxy-ethoxy)benzene, 2,2-bis-(4-hydroxycyclohexyl) propane, 2,4-dihydroxy-1,1,3,3-tetramethylcyclobutane, 2,2-bis-(4-.beta.-phydroxyethoxyphenyl)propane and 2,2-bis-(4-hydroxypropoxyphenyl)propane.

The polyalkylene dicarboxylate polymers may be branched by incorporating relatively small quantifies of tri- or tetrahydric alcohols or tri- or tetrabasic carboxylic acids, for example according to U.S. Pat. No. 3,692,744. Examples of further preferred branching agents are trimesic acid, trimellitic acid, trimethylolethane and trimethylolpropane and pentaerythritol.

Particularly preferred polyalkylene dicarboxylate polymers are those solely produced from terephthalic acid and the reactive derivatives thereof (for example the dialkyl esters thereof) and ethylene glycol (such as polyethylene terephthalate (PET)) and/or 1,4-butanediol (such as polybutylene terephthalate (PBT)), and mixtures of these polyalkylene terephthalate polymers.

Preferred mixtures of polyalkylene dicarboxylate polymers contain 1 to 50 weight percent, preferably 1 to 30 weight percent, of polyethylene terephthalate polymer and 50 to 99 weight percent, preferably 70 to 99 weight percent, of polybutylene terephthalate polymer.

The preferably used polyalkylene dicarboxylate polymers generally have an intrinsic viscosity of 0.4 to 1.5 deciliters per gram (dl/g), preferably of 0.5 to 1.2 dl/g, measured in phenol/o-dichlorobenzene (1:1 parts by weight) at 25° C. in a Ubbelohde viscosimeter.

The polyalkylene dicarboxylate polymers may be produced using known methods. The reaction between the alkanediol and the dicarboxylic acid is typically promoted by a metallic catalyst; useful catalysts in the preparation of polyesters are described, for example in U.S. Pat. No. 4,401,804, incorporated herein by reference. Further suitable reagents for forming polyesters are described, for example, in the following U.S. Pat. Nos. 2,465,319; 2,720,502; 2,727,881; 2,822,348; 3,047,539; all of which are incorporated herein by reference and in published art, see Pang et. al., *REVIEW of CONVENTIONAL and NOVEL POLYMERIZATION PROCESSES for POLYESTERS*, PROGRESS in POLYMER SCIENCE, ELSEVIER, 31 (2006) 1009-1037. A preparation example of described polyalkylene dicarboxylate polymers could entail heating the dicarboxylic acid or ester thereof, alkenediol and metallic catalyst to typically 180° C.-300° C. for a period of time suitable for producing the desired polymer. The amount of metallic catalyst used is typically about 0.005-0.2 percent by weight, based on the amount of acid or ester.

If component (iv) is present in the ignition resistant carbonate polymer compositions according to the invention, the ratio by weight of components (ii):(iv) may desirably be between 2:1 and 1:4, preferably between 1:1 and 1:2.

If present, the thermoplastic polyester polymer (iv) is present in an amount equal to or greater than about 0.5 parts by weight, preferably equal to or greater than about 1 part by weight, more preferably equal to or greater than about 2 parts by weight, more preferably equal to or greater than about 5 parts by weight, and more preferably equal to or greater than about 10 parts by weight based on the weight of the ignition resistant carbonate polymer composition. If present, the thermoplastic polyester polymer (iv) is present in an amount equal to or less than about 45 parts by weight, preferably equal to or less than about 40 parts by weight, more preferably equal to or less than about 35 parts by weight, more preferably equal to or less than about 30 parts by weight, and more preferably equal to or less than about 25 parts by weight based on the weight of the ignition resistant carbonate polymer composition.

Component (v) of the present invention is an aromatic phosphorous compound that has the formula I:

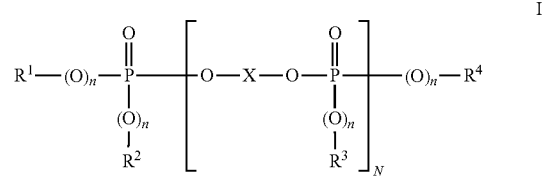

wherein in the formula I,

R$^1$, R$^2$, R$^3$ and R$^4$ independently of one another each denote optionally halogenated C$_1$- to C$_8$-alkyl, or C$_5$- to C$_6$-cycloalkyl, C$_6$- to C$_{20}$-aryl or C$_7$- to C$_{12}$-aralkyl, in each case optionally substituted by alkyl, preferably C$_1$-C$_4$-alkyl, and/or halogen, preferably bromine or chlorine. Preferably, R$^1$, R$^2$, R$^3$ and R$^4$ independently of one another represent C$_1$-C$_4$-alkyl, phenyl, naphthyl or phenyl-C$_1$-C$_4$-alkyl. The aromatic groups R$^1$, R$^2$, R$^3$ and R$^4$ can in turn be substituted by halogen and/or alkyl groups, preferably chlorine, bromine and/or C$_1$-C$_4$- alkyl. Particularly preferred aryl radicals are cresyl, phenyl, xylenyl, propylphenyl or butylphenyl and the corresponding brominated and chlorinated derivatives thereof.

X in the formula I denotes a mono- or polynuclear aromatic radical having 6 to 30 C atoms. This is derived from diphenols of the formula II. Preferred diphenols are diphenylphenol, bisphenol A, resorcinol or hydroquinone or chlorinated or brominated derivatives thereof.

n in the formula I independently of one another can be 0 or 1, and n is preferably 1.

N represents values from 0 to 30, preferably an average value of 0.3 to 20, particularly preferably 0.5 to 10, in particular 0.5 to 6.

Compounds of the formula Ia

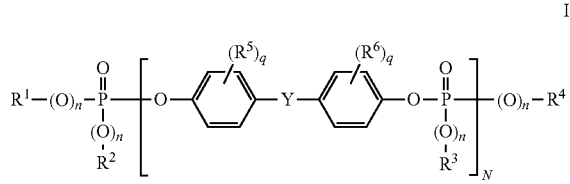

wherein
$R^1$, $R^2$, $R^3$ and $R^4$, n and N have the meaning given above in the case of formula I,
$R^5$ and $R^6$ independently of one another denote $C_1$-$C_4$-alkyl, preferably methyl, or halogen, preferably chlorine and/or bromine,
Y denotes $C_1$-$C_7$-alkylidene, $C_1$-$C_7$-alkylene, $C_5$-$C_{12}$-cycloalkylene, $C_5$-$C_{12}$-cycloalkylidene, —O—, —S—, —SO— or —CO— and q denotes 0 or the number 1 or 2, and Y preferably represents $C_1$-$C_7$-alkylidene, in particular isopropylidene, or methylene
are furthermore also a preferred phosphorus compound.

In the formula Ia, the group Ib

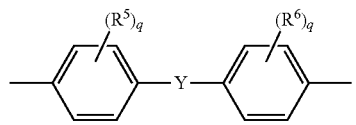

corresponds to the radical X in formula I.

Monophosphates (N=0), oligophosphates (N=1-30) or mixtures of mono- and oligophosphates (N>0) can be employed as component (v) according to the invention.

In one embodiment, component (v) is preferably present in the molding compositions according to the invention as a mixture of 1 to 99 weight percent, preferably 3 to 95 weight percent, more preferably 5 to 90 weight percent, more preferably 10 to 90 weight percent, more preferably 12 to 40 weight percent of at least one monophosphorus compound of the formula I and 1 to 99 weight percent, preferably 5 to 97 weight percent, more preferably 10 to 95 weight percent, more 10 to 90 weight percent, more preferably 60 to 88 weight percent of at least one oligophosphorus compound of the formula I, in each case weight percent based on the total weight of phosphorus compounds, and the mixture having an average N of 0.3 to 20, preferably 0.5 to 10, particularly preferably 0.5 to 6.

Monophosphorus compounds of the formula I are, in particular, tributyl phosphate, tris-(2-chloroethyl)phosphate, tris-(2,3-dibromopropyl)phosphate, triphenyl phosphate, tricresyl phosphate, diphenyl cresyl phosphate, diphenyl octyl phosphate, diphenyl 2-ethylcresyl phosphate, tri-(isopropylphenyl)phosphate, halogen-substituted aryl phosphates, methylphosphonic acid dimethyl ester, methylphosphonic acid diphenyl ester, phenylphosphonic acid diethyl ester, triphenylphosphine oxide or tricresylphosphine oxide.

The phosphorus compounds according to component (v) are known, for example see EP-A 363 608 and EP-A 640 655.

The phosphorus compounds (v) are present in an amount equal to or greater than 0.5 parts by weight, preferably equal to or greater than 1 part by weight, more preferably equal to or greater than 3 parts by weight, and most preferably equal to or greater than 6 parts by weight based on the total weight of the ignition resistant carbonate polymer composition of the invention. The phosphorus compounds (v) are present in an amount equal to or less than 40 parts by weight, preferably equal to or less than 30 parts by weight, more preferably equal to or less than 20 parts by weight, and most preferably equal to or less than 18 parts by weight based on the total weight of the ignition resistant carbonate polymer composition of the invention.

The anti-drip component (vi) of the present invention comprises a mixture of a fibrillating polytetrafluoroethylene and a fluorothermoplast. The fibrillating polytetrafluoroethylene (PTFE) is typically a homopolymer of tetrafluoroethylene (TFE) but may also be a copolymer of TFE with for example another fluorinated monomer such as chlorotrifluoroethylene (CTFE), a perfluorinated vinyl ether such as perfluoromethyl vinyl ether (PMVE) or a perfluorinated olefin such as hexafluoropropylene (HFP). The amount of the fluorinated comonomer should however be low enough so as to obtain a high molecular weight polymer that is not processible from the melt. This means in general that the melt viscosity of the polymer should be more than $10^{10}$ Pascal seconds (Pa·s.). Typically the amount of the optional comonomers should not be more than 1 percent so that the PTFE conforms to the ISO 12086 standard defining non-melt processible PTFE. Such copolymers of TFE are known in the art as modified PTFE.

The fibrillating PTFE typically has an average particle size (number average) of not more than 10 micron. Generally the average particle size of the fibrillating PTFE will be between 50 nanometer and 5 micron, for example between 100 nanometer and 1 micron. A practical range may be from 50 to 500 nanometers. Conveniently, fibrillating PTFE can be produced via aqueous emulsion polymerization.

The fluorothermoplast used is typically a semi-crystalline fluoropolymer. Typically the fluorothermoplast should have a melting point such that the fluorothermoplast is in its molten state under the melt processing conditions used for processing the carbonate polymer composition. Fluorothermoplasts having a melting point of 100° C. to 310° C. are generally desired for use in this invention. Preferably, the fluorothermoplast has a melting point of between 100° C. and 250° C. Frequently, the fluorothermoplast will have a melting point of not more than 225° C.

The fluorothermoplast should be used in amount effective to avoid agglomeration of the particles of fibrillating PTFE. The effective amount can be easily determined by one skilled in the art with routine experimentation. Typically, an effective amount of fluorothermoplast is an amount of at least 10 percent by weight based on the weight of fibrillating PTFE. It will generally be desired to maximize the amount of PTFE as a higher amount of PTFE will make the latter more effective in achieving desired effects when added to the carbonate polymer composition melt such as for example increasing the melt strength of the carbonate polymer composition. A practical range of the amount of fluorothermoplast is at least 10 percent by weight, for example between 10 and 60 percent by weight, conveniently between 12 and 50 percent by weight, commonly between 15 and 30 percent by weight based on the total weight of fibrillating PTFE.

Suitable fluorothermoplasts, for use include fluoropolymers that comprise interpolymerized units derived from at least one fluorinated, ethylenically unsaturated monomer, preferably two or more monomers, of the formula V:

$$R^7CF=CR_2 \qquad V$$

wherein each $R^7$ is independently selected from H, F, Cl, alkyl of from 1 to 8 carbon atoms, aryl of from 1 to 8 carbon atoms, cyclic alkyl of from 1 to 10 carbon atoms, or perfluoroalkyl of from 1 to 8 carbon atoms. The R group preferably contains from 1 to 3 carbon atoms. In this monomer each R group may be the same as each of the other R groups. Alternatively, each R group may be different from one or more of the other R groups.

The fluoropolymer may also comprise a copolymer derived from the interpolymerization of at least one formula V monomer with at least one nonfluorinated, copolymerizable comonomer having the formula VI:

$$R^8_2C=CR^8_2 \qquad VI$$

wherein each of $R^8$ is independently selected from H, Cl, or an alkyl group of from 1 to 8 carbon atoms, a cyclic alkyl group of from 1 to 10 carbon atoms, or an aryl group of from 1 to 8 carbon atoms. $R^8$ preferably contains from 1 to 3 carbon atoms.

Representative examples of useful fluorinated formula V monomers include, but are not limited to vinylidene fluoride, tetrafluoroethylene, hexafluoropropylene, chlorotrifluoroethylene, 2-chloropentafluoropropene, dichlorodifluoroethylene, 1,1-dichlorofluoroethylene, and mixtures thereof. Perfluoro-1,3-dioxoles may also be used. The perfluoro-1,3-dioxole monomers and their copolymers are described in U.S. Pat. No. 4,558,141, which is incorporated herein by reference.

Representative examples of useful formula VI monomers include ethylene, propylene, etc.

Particular examples of fluoropolymers include polyvinylidene fluoride, fluoropolymers derived from the interpolymerization of two or more different formula V monomers and fluoropolymers derived from one or more formula V monomers with one or more formula VI monomers. Examples of such polymers are those having interpolymerized units derived from vinylidene fluoride (VDF) and hexafluoropropylene (HFP); and those derived from tetrafluoroethylene (TFE) and at least 5 weight percent of at least one copolymerizable comonomer other than TFE. This latter class of fluoropolymers includes polymers of interpolymerized units derived from TFE and HFP; polymers of interpolymerized units derived from TFE, HFP and VDF; polymers of interpolymerized units derived from TFE, HFP and a formula VI monomer; and polymers derived from interpolymerized units derived from TFE and a formula VI monomer.

The fluorothermoplast may be produced by any of the known polymerization techniques although aqueous emulsion polymerization will generally be preferred for obtaining the melt-processible thermoplastic fluoropolymer.

Component (vi) is preferably prepared by blending an aqueous dispersion of the fibrillating PTFE with an aqueous dispersion of the fluorothermoplast and coagulating the mixed dispersion followed by drying the product. Such a method is disclosed in for example WO 01/27197. Such method offers the advantage that fibrillation of the PTFE is avoided while preparing component (iv). It is however also possible to prepare component (iv) by dry blending the PTFE and the fluorothermoplast. However, in the latter case, care should be taken that the shear forces applied in the blending operation do not cause the PTFE to fibrillate. Accordingly, blending should then typically be carried out at low temperatures at which fibrillation can be avoided. Once the PTFE is blended with an effective amount of the fluorothermoplast, fibrillation of the PTFE may be prevented and the melt additive can thus be handled in a conventional way. Component (iv) may contain further adjuvants to obtain particular desired properties.

Component (vi) comprising a mixture of fibrillating polytetrafluoroethylene and a fluorothermoplast is present in an amount equal to or greater than about 0.01 parts by weight, preferably equal to or greater than about 0.05 parts by weight, more preferably equal to or greater than about 0.1 parts by weight, more preferably equal to or greater than about 0.2 parts by weight, and more preferably equal to or greater than about 0.3 parts by weight based on the weight of the ignition resistant carbonate polymer composition. Component (vi) comprising a mixture of fibrillating polytetrafluoroethylene and a fluorothermoplast is present in an amount equal to or less than about 5 parts by weight, preferably equal to or less than about 3 parts by weight, more preferably equal to or less than about 1 parts by weight, more preferably equal to or less than about 0.8 parts by weight, more preferably equal to or less than about 0.6 parts by weight, and more preferably equal to or less than about 0.5 parts by weight based on the weight of the ignition resistant carbonate polymer composition.

The ignition resistant carbonate polymer compositions of the present invention may further comprise (vii) an inorganic phosphorous compound in combination with the organic phosphorous compound (v). Preferably the inorganic phosphorous compound is a hypophosphorous acid metal salt.

The "metal" which acts as a counter ion in the hypophosphorous acid metal salts is an alkaline metal belonging to the first, second and third main group or second, seventh, eighth subgroup of the periodic table of the elements. Among said salts, preferred are those where the following metals act as counter ion: Ca, Ba, Mg, Al, Zn, Fe, B, being the most preferred are the commercially available aluminium hypophosphite, calcium hypophosphite and/or mixtures thereof.

In order to improve the flame retardant effectiveness of the hypophosphorous acid metal salts, it is advisable that the average particle size of the powder (d50%) is lower than 40 micrometer and the highest particle size is below 100 micrometer more particularly it is preferable that d50% is below 20 micrometer and the highest particle size is below 50 micrometer.

The ignition resistant carbonate polymer composition according to the present invention may comprise a hypophosphorous acid metal salts in an amount from 0 parts by weight to 30 parts by weight, preferably in an amount from 1 part by weight to 30 parts by weight, more preferably in an amount from 2 parts by weight to 15 parts by weight based on the total weight of ignition resistant carbonate polymer composition. Preferably, the amount of organic phosphoric esters compared to the amount of the inorganic hypophosphite should be in the range from ½ to ⅕, in order to reduce the bleed out of the products during compounding and molding and not to affect the mechanical and thermal properties of final polymer articles.

The ignition resistant carbonate polymer compositions according to the invention may contain at least one of the conventional additives, such as lubricants and mold release agents, for example pentaerythritol tetrastearate, nucleating agents, anti-static agents, stabilizers, fillers and reinforcing materials as well as dyes and pigments. One such stabilizer is present to minimize ester-carbonate interchange. Such stabilizers are known in the art, for example see U.S. Pat. Nos. 5,922,816; 4,532,290; 4,401,804, all of which are incorporated herein by reference, and may comprise certain phosphorous containing compounds that include phosphoric acid, certain organic phosphorous compounds such as distearyl pentaerythritol diphosphate, mono or dihydrogen phosphate, or mono-, di-, or trihydrogen phosphate compounds, phosphate compounds, and certain inorganic phosphorous compounds such as monosodium phosphate and monopotassium phosphate, silyl phosphates, and silyl phosphate derivatives, alone or in combination and present in an amount effective to inhibit ester-carbonate interchange in the composition.

The ignition resistant carbonate polymer compositions of the present invention may further comprise a filler and/or reinforcing material. Preferred fillers, which may also have a reinforcing action, are glass fibers, glass beads, mica, silicates, quartz, talc, titanium dioxide, and/or wollastonite alone or in combinations.

If present, the filler and/or reinforcing material is present in an amount equal to or greater than about 0.5 parts by weight, preferably equal to or greater than about 1 part by weight, more preferably equal to or greater than about 2 parts by weight, more preferably equal to or greater than about 5 parts by weight, and more preferably equal to or greater than about 10 parts by weight based on the weight of the ignition resistant carbonate polymer composition. If present, the filler and/or reinforcing material is present in an amount equal to or less than about 60 parts by weight, preferably equal to or less than about 40 parts by weight, more preferably equal to or less than about 30 parts by weight, more preferably equal to or less than about 25 parts by weight, and more preferably equal to or less than about 20 parts by weight based on the weight of the ignition resistant carbonate polymer composition.

The ignition resistant carbonate polymer compositions according to the invention may contain up to 35 weight percent, relative to the overall ignition resistant carbonate polymer composition, of a further, optionally synergistic flame retardant. Examples of further flame retardants which may be mentioned are organic halogen compounds, such as decabromobisphenyl ether, tetrabromobisphenol, inorganic halogen compounds such as ammonium bromide, nitrogen compounds, such as melamine, melamine/formaldehyde resins, inorganic hydroxide compounds, such as Mg, Al hydroxide, inorganic compounds such as antimony oxides, barium metaborate, hydroxoantimonate, zirconium oxide, zirconium hydroxide, molybdenum oxide, ammonium molybdate, zinc borate, ammonium borate, barium metaborate, talc, silicate, silicon oxide and tin oxide, as well as siloxane compounds.

Optionally, the ignition resistant polymer composition may further comprise an impact modifier, for example see U.S. Pat. No. 6,545,089 and US Publication 2007/0225441 which are incorporated herein by reference. Preferable impact modifiers are rubber materials having a $T_g$ equal to or less than 0° C., preferably equal to or less than −10° C., more preferably equal to or less than −20° C., and most preferably equal to or less than −30° C. Suitable rubbers include polymers such as styrene and butadiene (SB) copolymer, acrylate rubbers, particularly homopolymers and copolymers of alkyl acrylates having from 4 to 6 carbons in the alkyl group or polyolefin elastomers, particularly copolymers of ethylene, propylene and optionally a nonconjugated diene. In addition, mixtures of the foregoing rubbery polymers may be employed if desired.

Preferably, the impact modifier is a grafted homopolymer or copolymer of butadiene that is grafted with a polymer of styrene and methyl methacrylate. Some of the preferred rubber-containing materials of this type are the known methyl methacrylate, butadiene, and styrene (MBS) core/shell grafted copolymers having a $T_g$ equal to or less than 0° C. and a rubber content greater than 40 percent, typically greater than 50 percent. They are generally obtained by graft polymerizing styrene and methyl methacrylate and/or equivalent monomers in the presence of a conjugated diene polymer rubber core, preferably a butadiene homo- or co-polymer. The grafting monomers may be added to the reaction mixture simultaneously or in sequence, and, when added in sequence, layers, shells or wart-like appendages can be built up around the substrate latex, or core. The monomers can be added in various ratios to each other.

Other impact modifiers useful in the compositions of this invention are those based generally on a long-chain, hydrocarbon backbone, which may be prepared predominantly from various mono- or dialkenyl monomers and may be grafted with one or more styrenic monomers. Representative examples of a few olefinic elastomers which illustrate the variation in the known substances which would suffice for such purpose are as follows: butyl rubber; chlorinated polyethylene rubber (CPE); chlorosulfonated polyethylene rubber; an olefin polymer or copolymer such as ethylene/propylene (EP) copolymer, ethylene/styrene (ES) copolymer or ethylene/propylene/diene (EPDM) copolymer, which may be grafted with one or more styrenic monomers; neoprene rubber; nitrile rubber; polybutadiene and polyisoprene.

If used, the impact modifier is preferably present in an amount of at least about 1 part by weight, preferably at least about 2 parts by weight, more preferably at least about 5 parts by weight, even more preferably at least about 7.5 parts by weight, and most preferably at least about 10 parts by weight based on the total weight of the polymer blend composition. Generally, the impact modifier is present in an amount less than or equal to about 30 parts by weight, preferably less than or equal to about 25 parts by weight, more preferably less than or equal to about 20 parts by weight, even more preferably less than or equal to about 15 parts by weight, and most preferably less than or equal to about 10 parts by weight based on the weight of the polymer blend composition.

The polymer blend composition of the present invention can be employed in mixtures, alloys or blends with other polymer and/or copolymer resins (e.g., polymers other than the polymers of components (i), (ii), (iii), and/or (iv)), for example, mixtures with polysulfones, polyethers, polyether imide, polyphenylene oxides or mixtures thereof. If present, the other polymer and/or copolymer resin is present in an amount equal to or greater than about 0.5 parts by weight, preferably equal to or greater than about 1 part by weight, more preferably equal to or greater than about 2 parts by weight, more preferably equal to or greater than about 5 parts by weight, and more preferably equal to or greater than about 10 parts by weight based on the weight of the ignition resistant carbonate polymer composition. If present, the other polymer and/or copolymer resin is present in an amount equal to or less than about 45 parts by weight, preferably equal to or less than about 40 parts by weight, more preferably equal to or less than about 35 parts by weight, more preferably equal to or less than about 30 parts by weight, and more preferably equal to or less than about 25 parts by weight based on the weight of the ignition resistant carbonate polymer composition.

The ignition resistant carbonate polymer compositions comprising components (i), (ii), (v), (vi) and optionally one or more of (iii), (iv), stabilizers, dyes, pigments, lubricants and mold release agents, nucleating agents, as well as antistatic agents, fillers and reinforcing materials are produced by mixing the particular components in a known manner and melt-compounding and/or melt-extruding them at temperatures of from 200° C. to 300° C. in conventional units such as internal kneaders, extruders and twin-screw extruders.

The individual components may be mixed in a known manner both in succession and simultaneously and both at approximately 23° C. (room temperature) and at a higher temperature.

The present invention accordingly also provides a process for the production of the ignition resistant carbonate polymer compositions.

By virtue of their excellent ignition resistance, in particular short burn time, and good mechanical properties and elevated heat resistance, the ignition resistant carbonate polymer compositions according to the invention are suitable for the production of fabricated articles of any kind, in particular those subject to stringent requirements with regard to mechanical properties.

The ignition resistant carbonate polymer compositions of the present invention are thermoplastic. When softened or melted by the application of heat, the ignition resistant carbonate polymer compositions of this invention can be formed or molded into fabricated articles using conventional techniques such as compression molding, injection molding, gas assisted injection molding, calendaring, vacuum forming, thermoforming, extrusion and/or blow molding, alone or in combination. The ignition resistant polymer compositions can also be fabricated, formed, spun, or drawn into films, fibers, multi-layer laminates or extruded into sheets and/or profiles. Examples of fabricated articles which may be produced are: enclosures of all kinds, for example for domestic appliances such as juice extractors, coffee machines, food mixers, for office equipment, such as monitors, printers, copiers or cladding sheet for the building sector and automotive components. They may also be used in electrical engineering applications as they have very good electrical properties.

The ignition resistant carbonate polymer compositions according to the invention may furthermore, for example, be used to produce the following fabricated articles or shaped articles: interior trim for rail vehicles, interior and exterior automotive applications, enclosures for electrical devices containing small transformers, enclosures for information dissemination and transmission devices, enclosures and cladding for medical purposes, massage devices and enclosures therefore, toy vehicles for children, sheet wall elements, enclosures for safety equipment, hatchback spoilers, thermally insulated transport containers, apparatus for keeping or caring for small animals, articles for sanitary and bathroom installations, cover grilles for ventilation openings, articles for summer houses and sheds, and enclosures for garden appliances. Preferred fabricated articles include housings or enclosures such as for: power tools, appliances, consumer electronic equipment such as TVs, VCRs, DVD players, web appliances, electronic books, etc., or housings or enclosures such as for: information technology equipment such as telephones, computers, monitors, fax machines, battery chargers, scanners, copiers, printers, hand held computers, flat screen displays, etc.

The present invention accordingly also provides the use of the ignition resistant carbonate polymer compositions according to the invention for the production of fabricated articles of all kinds, preferably those stated above, and the articles made from the ignition resistant carbonate polymer compositions according to the invention.

EXAMPLES

To illustrate the practice of this invention, examples of preferred embodiments are set forth below. However, these examples do not in any manner restrict the scope of this invention.

The compositions of Examples 1 to 5 and Comparative Examples A to D are melt compounded in a Werner and Pfleiderer ZSK-25 25 mm twin-screw co-rotating extruder. The temperature profile from the hopper to the nozzle is 220° C. to 265° C. Prior to compounding, the polycarbonate is dried for at least 4 hours at 120° C. A three or four feeder system is used: the polycarbonate is fed via one feeder, the ABS, MRA-2, and powdered additives are added as a dry blend via a second feeder, the BAPP is added at 80° C. via a liquid feeder, and for examples comprising PET, it is added via a fourth feeder. When MRA-1 is used, it is sprayed onto the polycarbonate pellets prior to feeding them into the extruder. The throughput is 10 kilograms per hour, the extrudate is cooled in a 50° C. water bath and commuted to pellets.

Mechanical and thermal property test specimens measuring 3.2 mm thick are injection molded on a Demag IntElect 80/370-310 type electrical injection molding machine with the following parameters: Barrel Profile, nozzle to hopper: 290° C. to 250° C.; Mold Temperature: 80° C.; and Cycle Time: 57 seconds.

Underwriters' Laboratories 94 (UL 94) burn test specimens measuring 1 mm thick are injection molded on a Demag IntElect 80/370-310 type electrical injection molding machine with the following parameters: Barrel Profile, nozzle to hopper: 235° C. to 240° C.; Mold Temperature: 60° C.; and Cycle Time: 36 seconds.

UL 94 burn test specimens measuring 1.6 mm thick are injection molded on a Demag IntElect 80/370-310 type electrical injection molding machine with the following parameters: Barrel Profile, nozzle to hopper: 235° C. to 240° C.; Mold Temperature: 60° C.; and Cycle Time: 39.5 seconds.

UL 94 burn test specimens measuring 2.5 mm thick are injection molded on a Demag IntElect 80/370-310 type electrical injection molding machine with the following parameters: Barrel Profile, nozzle to hopper: 235° C. to 240° C.; Mold Temperature: 60° C.; and Cycle Time: 42 seconds.

The formulation content of Examples 1 to 5 and Comparative Examples A to D are given in Table 1, amounts are in parts by weight. In Table 1:

"PC" is a bisphenol-A polycarbonate homopolymer having a melt flow of 23 and commercially available as CALIBRE™ 300-23 from the Dow Chemical Company.

"mABS-1" is a mass polymerized acrylonitrile, butadiene, and styrene terpolymer having about 15 percent acrylonitrile, 12 percent butadiene rubber, and an average rubber particle size (Dv) as determined by Coulter Counter of 1.2 microns;

"mABS-2" is a mass polymerized acrylonitrile, butadiene, and styrene terpolymer having about 20 percent acrylonitrile, 15 percent butadiene rubber, and an average rubber particle size (Dv) as determined by Coulter Counter of 1.15 microns;

"eABS" is an emulsion polymerized acrylonitrile, butadiene, and styrene terpolymer having about 12 percent acrylonitrile and 48 percent butadiene rubber;

"PET" is a polyethylene terephthalate with an intrinsic viscosity of 0.64 dl/g available as PET LIGHTER™ C73 from Equipolymer;

"BAPP" is a phosphate flame retardant comprising bisphenol-A bis(diphenyl phosphate) available as ADK STAB FP-700 from Adeka Argus;

"PTFE-1" is an anti-drip agent comprising a mixture if a fibril forming polytetrafluoroethylene polymer and a fluorothermoplast available as DYNEON™ MM5935EF from 3M;

"PTFE-2" is an anti-drip agent comprising a fibril forming polytetrafluoroethylene having an average particle size of 550 microns, a bulk density of 500 g/l, a specific gravity of 2.17, and a Rheometric Pressure of 8 MPa according to ASTM D4895 available as ALGOFLON™ DF210 from Solvay; and "MRA-1" is a liquid mold release agent comprising octyldodecyl stearate available as LOXIOL™ 3820 from Cognis.

"MRA-2" is a powdered mold release agent comprising pentaerythritol tetrastearate available as LOXIOL P861 from Cognis.

Property performance for Examples 1 to 5 and Comparative Examples A to D are reported in Table 1. In Table 1:

"UL-94" is The Underwriters Laboratories' Standard 94 flammability test which is performed on 1.1 millimeter (mm), 1.6 mm, and 2.5 mm test specimens. Ratings are according to the standard;

"Spiral Flow" flow length measured in mm is determined on a Demag IntElect 80/370-150 having a screw diameter of 25 mm. using an open spiral mold with the following dimensions:
Total potential length: 117 cm; Thickness: 2 mm; and Width: 5 mm. The injection molding conditions are:

| Temperature, ° C. | 260 |
| Injection Pressure, Bar | 1,200 |
| Injection Speed, mm/sec | 100 |
| Holding Time, sec | 0.5 |
| Holding Pressure, Bar | 300 |
| Cooling Time, sec | 25 |
| Rotation Per Minute (RPM) | 100 |
| Back Pressure, Bar | 120 |
| Dosing, mm | 24 |

"MFR" is the melt flow rate determined according to ISO 1133 using a Zwick B4106.200 at a temperature of 230° C. and a load of 3.8 kg;

"Tensile Strength", "Tensile Elongation", and "Tensile Modulus" property testing is done in accordance with ISO 527 at room temperature using an Zwick 1455 mechanical tester, tensile strength and elongation are performed at a rate of 50 mm/min. and tensile modulus was performed at a rate of 1 mm/min.;

"Vicat" softening temperature is determined on a Ceast HDT 300 Vicat machine in accordance with ISO 306 at 120° per hour and 1 kg;

"Izod" impact resistance as measured by the Notched Izod test (Izod) is determined according to ISO 180/1A at 23° C. Test specimens measured 10 mm×80 mm×4 mm. The specimens were notched with a notcher to give a 250 micrometer radius notch. A Zwick 5110 Izod impact testing unit was used; and "Surface Aesthetics" is determined by visual examinations using the following criteria:

TABLE 1

| | Example | | | | | Comparative Example | | | |
|---|---|---|---|---|---|---|---|---|---|
| | 1 | 2 | 3 | 4 | 5 | A | B | C | D |
| Component | | | | | | | | | |
| PC | 69.6 | 69.6 | 69.4 | 57.2 | 57.2 | 59.2 | 59.2 | 59.2 | 59.2 |
| mABS-1 | 10 | 10 | 10 | | | | | | |
| mABS-2 | | | | 10 | 10 | 5 | 5 | | |
| eABS | 5.5 | 5.5 | 5.5 | | | | | 7.5 | 7.5 |
| PET | | | | 20 | 20 | 25 | 25 | 22.5 | 22.5 |
| BAPP | 14 | 14 | 14 | 12 | 12 | 10 | 10 | 10 | 10 |
| PTFE-1 | 0.4 | 0.2 | | 0.4 | | 0.4 | | 0.4 | |
| PTFE-2 | | | 0.4 | | 0.4 | | 0.4 | | 0.4 |
| IRGANOX | 0.3 | 0.3 | 0.3 | | | | | | |
| MRA-1 | | | | 0.2 | 0.2 | 0.2 | 0.2 | 0.2 | 0.2 |
| MRA-2 | 0.4 | 0.4 | 0.4 | | | | | | |
| Properties | | | | | | | | | |
| UL 94 Rating | | | | | | | | | |
| 1.0 mm | V-0 | V-2 | V-2 | | | | | | |
| % burn bars fail test | 0 | 40 | 60 | | | | | | |
| 1.6 mm | V-0 | V-0 | V-0 | V-0 | V-2 | V-0 | V-2 | V-2 | V-2 |
| % burn bars fail test | 0 | 0 | 0 | | | | | | |
| 2.5 mm | | | | V-0 | V-0 | V-0 | V-0 | V-0 | V-2 |
| MFR @ 260 C./3.8 Kg, g/10 min | 18.1 | 21.8 | 20.7 | | | | | | |
| Spiral Flow, mm | 55 | 56 | 55 | | | | | | |
| Izod, kJ/m² | 6.9 | 8.7 | 7.1 | | | | | | |
| Tensile Yield, MPa | 57.2 | 56.7 | 60.4 | | | | | | |
| Tensile Modulus, MPa | | | | 2,973 | 2,833 | 3,075 | 2,924 | 2,857 | 2,816 |
| Tensile Elongation, % | 23 | 19.5 | 14.5 | | | | | | |
| Vicat, ° C. | 105.8 | 104 | 105.2 | 105.3 | 104.1 | 113.5 | 112.7 | 113.2 | 113.4 |
| Surface Aesthetics | +++ | +++ | ± | +++ | ± | +++ | ± | +++ | ± |

± poor surface quality, showing clearly distinguishable splay and flow marks, surface imperfections such as pitting, craters, etc. areas or* matt gloss areas
+ reasonable surface quality, showing reduced/some splay and surface imperfections, with some pitting
++ good surface quality showing only a few surface imperfections
+++ excellent surface quality, no splay nor flow marks; smooth and glossy surface.

As can be seen by the data hereinabove, the examples of the invention comprising the anti-drip agent comprising a mixture of a fibril forming polytetrafluoroethylene polymer and a fluorothermoplast demonstrate a better combination of flammability, physical, thermal, and aesthetic performance as compared to the comparative examples comprising the anti-drip agent comprising only a fibril forming polytetrafluoroethylene polymer.

The invention claimed is:

1. An ignition resistant carbonate polymer composition comprising:
   (i) an aromatic polycarbonate or an aromatic polyester carbonate,
   (ii) a graft polymer,
   (iii) optionally one or more thermoplastic vinyl (co)polymer,
   (iv) optionally one or more thermoplastic polyester polymer,
   (v) an aromatic phosphorous compound represented by the formula I:

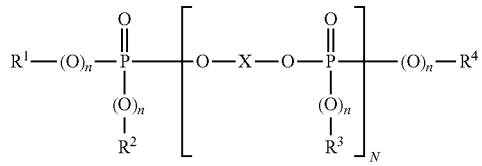

wherein, $R^1$, $R^2$, $R^3$ and $R^4$ independently of one another each denote optionally halogenated $C_1$- to $C_8$-alkyl, or $C_5$- to $C_6$-cycloalkyl, $C_6$- to $C_{20}$-aryl or $C_7$- to $C_{12}$-aralkyl, in each case optionally substituted by alkyl and/or halogen, X denotes a mono- or polynuclear aromatic radical having 6 to 30 C atoms, n independently of one another is 0 or 1, N represents values from 0 to 30, (vi) a mixture of a fibril forming polytetrafluoroethylene polymer and a fluorothermoplast, and (vii) optionally an hypophosphorous acid metal salt.

2. An ignition resistant carbonate polymer composition comprising:
   (i) from 40 to 99 parts by weight of an aromatic polycarbonate or an aromatic polyester carbonate,
   (ii) from 0.5 to 60 parts by weight of a graft polymer of
      (ii.a) from 5 to 99 percent by weight of one or more vinyl monomers on
      (ii.b) from 95 to 1 percent by weight of one or more grafting backbones with a glass transition temperature ($T_g$) of less than 10° C.,
   (iii) from 0 to 45 parts by weight of at least one thermoplastic vinyl (co)polymer,
   (iv) from 0 to 45 parts by weight of at least one thermoplastic polyester polymer,
   (v) from 0.5 to 40 parts by weight of an aromatic phosphorous compound represented by the formula I:

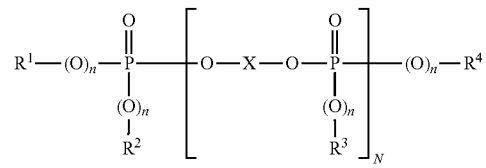

wherein in the formula I, $R^1$, $R^2$, $R^3$ and $R^4$ independently of one another each denote optionally halogenated $C_1$- to $C_8$-alkyl, or $C_5$- to $C_6$-cycloalkyl, $C_6$- to $C_{20}$-aryl or $C_7$- to $C_{12}$-aralkyl, in each case optionally substituted by alkyl and/or halogen, X denotes a mono- or polynuclear aromatic radical having 6 to 30 C atoms, n independently of one another is 0 or 1, N represents values from 0 to 30, (vi) from 0.01 to 5 parts by weight of a mixture of a fibril forming polytetrafluoroethylene polymer and a fluorothermoplast, and (vii) from 0 to 30 parts by weight of an hypophosphorous acid metal salt, wherein parts by weight are based on the total weight of the ignition resistant carbonate polymer composition.

3. The ignition resistant carbonate polymer composition of claim 1 wherein the graft polymer is present in an amount of from 1 to 40 parts by weight and the thermoplastic polyester polymer is present in an amount of from 1 to 30 parts by weight, wherein parts by weight are based on the total weight of the ignition resistant carbonate polymer composition wherein the thermoplastic polyester polymer is one or more of PET, PBT, or mixtures thereof wherein each thermoplastic polyester polymer independently has an intrinsic viscosity of from 0.4 to 1.5 dl/g.

4. The ignition resistant carbonate polymer composition of claim 1 wherein X is derived from a diol selected from diphenylphenol, bisphenol A, resorcinol, or hydroquinone.

5. The ignition resistant carbonate polymer composition of claim 1 wherein the phosphorous compound (v) comprises a mixture of from 3 to 95 weight percent monophosphate compound of formula I and 97 to 5 weight percent oligomeric phosphate compound of formula I, weight percent based on the total weight of the phosphorus compounds (v).

6. The ignition resistant carbonate polymer composition of claim 1 wherein the mixture of the fibril forming polytetrafluoroethylene polymer and the fluorothermoplast is present in an amount of from 0.1 to 3 parts by weight based on the total weight of the ignition resistant carbonate polymer composition.

7. The ignition resistant carbonate polymer composition of claim 1 wherein in component (vi) the fluorothermoplast comprises a polymer of interpolymerized units derived from tetrafluoroethylene (TFE) and hexafluoropropylene (HFP), a polymer of interpolymerized units derived from TFE, HFP and vinylidenefluoride (VDF), a polymer of interpolymerized units derived from TFE, HFP and a monomer represented by formula VI, or a polymer derived from interpolymerized units derived from TFE and a monomer represented by formula VI:

$$R^8_2C\!=\!CR^8_2 \qquad\qquad VI$$

wherein each of $R^8$ is independently selected from H, Cl, or an alkyl group of from 1 to 8 carbon atoms, a cyclic alkyl group of from 1 to 10 carbon atoms, or an aryl group of from 1 to 8 carbon atoms.

8. The ignition resistant carbonate polymer composition of claim 1 wherein in component (vi) the fluorothermoplast comprises a terpolymer having interpolymerized units derived from tetrafluoroethylene (TFE), hexafluoropropylene (HFP) and vinylidenefluoride (VDF).

9. The ignition resistant carbonate polymer composition of claim 1 wherein in the hypophosphorous acid metal salt (vii) is aluminium hypophosphite, calcium hypophosphite, or mixtures there of and present in an amount defined by the ratio of components (v):(vii) of from 1:2 to 1:5.

10. A method for making an ignition resistant carbonate polymer composition comprising the step of melt-compounding:
- (i) from 40 to 99 parts by weight of an aromatic polycarbonate or an aromatic polyester carbonate,
- (ii) from 0.5 to 60 parts by weight of a graft polymer of
  - (ii.a) from 5 to 99 parts by weight of one or more vinyl monomers on
  - (ii.b) from 95 to 1 percent by weight of one or more grafting backbones with a glass transition temperature ($T_g$) of less than 10° C.,
- (iii) from 0 to 45 parts by weight of at least one thermoplastic vinyl (co)polymer,
- (iv) from 0 to 45 parts by weight of at least one thermoplastic polyester polymer,
- (v) from 0.5 to 40 parts by weight of an aromatic phosphorous compound represented by the structure:

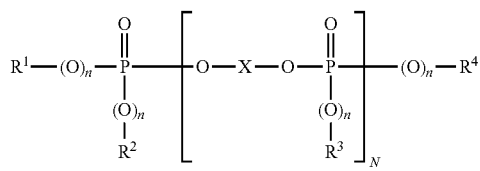

I wherein in the formula I, $R^1$, $R^2$, $R^3$ and $R^4$ independently of one another each denote optionally halogenated $C_1$- to $C_8$-alkyl, or $C_5$- to $C_6$-cycloalkyl, $C_6$- to $C_{20}$-aryl or $C_7$- to $C_{12}$-aralkyl, in each case optionally substituted by alkyl and/or halogen, X in the formula I denotes a mono- or polynuclear aromatic radical having 6 to 30 C atoms, n in the formula I independently of one another can be 0 or 1, N represents values from 0 to 30,

- (vi) from 0.01 to 5 parts by weight of a mixture if a fibril forming polytetrafluoroethylene polymer and a fluorothermoplast, and
- (vii) from 0 to 30 parts by weight of an hypophosphorous acid metal salt, wherein parts by weight are based on the total weight of the ignition resistant carbonate polymer composition.

11. A formed article comprising the ignition resistant carbonate polymer of claim 1.

12. The formed article of claim 11 is an interior trim for rail vehicle, an interior and/or exterior automotive article, an enclosure for electrical devices containing small transformers, an enclosure for information dissemination and/or transmission device, an enclosure and/or cladding for medical purposes, a message device and/or enclosures therefore, a toy vehicles for children, a sheet wall element, an enclosure for safety equipment, a hatchback spoiler, a thermally insulated transport container, an apparatus for keeping and/or caring for small animals, an article for sanitary and/or bathroom installations, a cover grill for ventilation openings, an article for summer houses and sheds, enclosures for garden appliances and/or an enclosure for: a power tool, an appliance, a TV, a VCR, a DVD player, a web appliance, an electronic book, a telephone, a computer, a monitor, a fax machine, a battery charger, a scanner, a copier, a printer, a hand held computer, or a flat screen display.

* * * * *